United States Patent [19]

Carespodi

[11] Patent Number: 5,342,684
[45] Date of Patent: Aug. 30, 1994

[54] POLYMERIC DIE-CUTTABLE LIDDING MATERIALS

[75] Inventor: Dennis L. Carespodi, Winston-Salem, N.C.

[73] Assignee: R. J. Reynolds Tobacco Company, Winston-Salem, N.C.

[21] Appl. No.: 65,726

[22] Filed: May 21, 1993

Related U.S. Application Data

[63] Continuation-in-part of Ser. No. 746,257, Aug. 15, 1991, abandoned.

[51] Int. Cl.⁵ .......................... B32B 3/26; B32B 7/02; B32B 7/12
[52] U.S. Cl. .................................. 428/347; 428/349; 428/315.5; 428/315.7; 428/315.9; 428/317.9; 428/483; 428/516
[58] Field of Search ............. 428/34.8, 35.2, 36.6, 428/323, 347, 349, 315.5, 315.7, 315.9, 317.9, 476.1, 483, 516, 517, 518

[56] References Cited

U.S. PATENT DOCUMENTS

| | | | |
|---|---|---|---|
| 4,377,616 | 3/1983 | Ashcraft et al. | 428/213 |
| 4,438,175 | 3/1984 | Ashcraft et al. | 428/315.5 |
| 4,629,657 | 12/1986 | Gulati et al. | 428/461 |
| 4,681,803 | 7/1987 | Liu | 428/349 X |
| 4,701,369 | 10/1987 | Duncan | 428/313.9 |
| 4,701,370 | 10/1987 | Park | 428/314.4 |
| 4,741,950 | 5/1988 | Liu et al. | 428/315.5 |
| 4,758,462 | 7/1988 | Park et al. | 428/213 |
| 4,770,931 | 9/1988 | Pollock et al. | 428/304.4 |
| 4,780,364 | 10/1988 | Wade et al. | 428/315.5 |
| 4,784,885 | 11/1988 | Carespodi | 428/36.8 |
| 4,965,123 | 10/1990 | Swan et al. | 428/314.4 |
| 5,019,447 | 5/1991 | Keller | 428/516 X |
| 5,028,480 | 7/1991 | Dean | 428/516 X |
| 5,055,338 | 10/1991 | Sheth et al. | 428/698 X |
| 5,091,236 | 2/1992 | Keller et al. | 428/213 |
| 5,151,317 | 9/1992 | Bothe | 428/516 X |

Primary Examiner—Daniel R. Zirker

[57] ABSTRACT

An all polymeric, die cuttable symmetrical lidding laminate for a container which is heat sealable to and peelable from the container. In one embodiment, the laminate structure comprises a core layer of a biaxially oriented voided polypropylene film to the opposite sides of which first and second outer layers of a nonvoid-bearing biaxially oriented polyester film are adhesively laminated to form a symmetrical or balanced laminate structure. A heat seal layer or coating is applied to one side of the laminate structure. A static charge dissipating layer or coating is applied to the other side of the laminate structure. The laminate has sufficient stiffness to be readily die cuttable, has excellent lay flat characteristics, remains substantially curl-free when exposed to heat from either side and is readily denested from a stack of lids during package processing.

18 Claims, 2 Drawing Sheets

POLYMERIC DIE-CUTTABLE LIDDING MATERIALS

This is a continuation-in-part of copending application Ser. No. 07/746,257, filed Aug. 15, 1991, now abandoned.

FIELD OF THE INVENTION

The present invention relates to a laminated polymeric film and more particularly to a peelable lid laminate for a container wherein the laminate is die-cuttable and heat sealable to the container.

DESCRIPTION OF THE PRIOR ART

Peelable lidding materials for containers are well known in the art, and are especially useful in the food packaging art as peelable closures for plastic convenience food packaging. Typically, such lidding materials comprise heavy gauge monolithic metal foils or metal foil/polymeric film laminates which are die cuttable so as to be supplied or dispensed from a stack of lids in conventional food packaging machinery. Because such lids must be denested from the stacks, static charge buildup on the lids must be reduced or dissipated so as to facilitate ready denesting. To seal such lids to a container, a heat sealable coating or film is applied to one side of the foil or foil/film laminate. In the packaging machine, an individual lid is placed on a container and heat sealed to the container. The known monolithic foil lidding materials typically used in such packaging applications comprise aluminum foil with a minimum thickness of about 1.5 mils (0.0015"). At foil thicknesses below about 1.5 mils, the foil material does not have adequate stiffness for feeding during the die cutting operation, nor the stiffness for denesting and dispensing of individual die-cut lids on the packaging machinery.

Conventional heat sealable foil/film laminates comprise a 1.5 to 2.5 mil thick layer of aluminum foil and are not readily recyclable because of their composite construction. Incineration of such laminates produces a very high percentage of ash, in some cases, approaching 95% ash by weight.

Aluminum foil and foil/film laminates have been the lidding materials of choice because of their inherent stiffness, deadfold and lay-flat characteristics, air and moisture barrier properties, thermal stability, static charge dissipation characteristics and relatively low cost. A large number of heat seal coatings, lacquers, extrusions and films have been developed for application to or lamination with aluminum foil to provide peelable heat seals to most plastic container materials, such as polypropylene, polystyrene and polyester.

As environmental concerns increase, and the recyclability of packaging materials is viewed as a desirable objective, great interest has been generated in non-foil or all-plastic substitutes for foil containing lidding materials. However, replacing aluminum foil in packaging processes and machines that use die-cut lidding has proven difficult because plastics typically do not have the desirable physical characteristics of aluminum foil, especially the stiffness, lay-flat and static charge dissipation characteristics of the foil.

An acceptable non-foil or all-plastic lidding material must be stiff enough to be die-cut properly and, once die-cut, the lid must be stiff enough to be held by its edges during dispensing in a packaging machine without bending or curling. In addition, the lid must remain flat when exposed to heat either from the product to be packaged, such as a heated food product, e.g., hot-filled applesauce, or from the packaging machine itself when the container and lid are cycled to an idle position beneath the heat sealing mechanism of the machine. Curling of the lid from exposure to handling, dispensing, or heat or from stresses in the laminate that occur during the lamination process has been a primary problem with non-foil or all-plastic lidding laminates. To facilitate denesting from a stack of lids, the lid must have good static charge dissipation characteristics.

One known approach to solving the curling problem described above is to produce a heavy gauge coextruded cast film consisting of polybutylene terephthalate (PBT)/high impact polystyrene/modified sealant layer for use as a lidding for polystyrene containers. Because the structure is a coextruded cast film, lamination is not required and curl does not occur. The polystyrene core layer has a thickness of about 3.0 to 5.0 mils to provide stiffness and die cuttability and the PBT layer is heat resistant and printable.

While this coextruded cast film approach appears to be one solution to the aforementioned problems relating to non-foil or all-plastic lids, it requires the capability of manufacturing coextruded cast films which many packaging operations do not have. Moreover, since the lidding is coextruded, there is a limited number of cast films that can be made because the materials of the layers must be compatible in a coextrusion process. Unlike laminates, a coextruded cast film must also be surface printed rather than reverse printed which could result in ink pick-off in the area of the heat seal.

Another approach to providing a heat stable, die-cuttable and heat sealable lidding material is disclosed in my U.S. Pat. No. 4,784,885 assigned to the assignee of the present invention.

It would be desirable to provide a non-foil laminated lidding material which is easily die-cuttable, readily denested and sufficiently stiff for dispensing in a packaging machine and which does not curl when exposed to a hot-filled container or the heat of the heat seal mechanism of the packaging machine. In the case of microwavable food packaging containers, peelable non-foil or all-plastic lidding material is essential. Advantageously, a non-foil lid also permits metal detection equipment to be used for detecting the presence of metal foreign objects in a package or container.

SUMMARY OF THE INVENTION

The present invention comprises a non-foil laminate lidding structure that is useful for packaging applications, such as heat sealable lids for food containers and the like. The lidding structure of the invention has enhanced performance characteristics over those currently available. The lidding structure of the invention is readily die-cuttable, sufficiently stiff and having static charge dissipation characteristics to be die-cut in lid form, denested and dispensed in a packaging apparatus. The laminate lidding structure has a core layer with substantially identical oriented layers on both sides of the core layer to define a symmetrical or "balanced" construction. Such symmetrical laminate structure has a sealant layer adhered to one side thereof for heat sealing to a container and a static charge dissipation layer adhered to the other side thereof. Thus, the symmetrical laminate lidding structure is of "balanced" construction, that is, exclusive of the heat seal layer and static charge dissipation layer, it has the identical structure on both sides of the core layer of the laminate. Such symmetrical construction produces a flat lid that remains substantially flat (i.e., no curling) even when it is exposed to heat from either side and which is readily dispensed in a packaging apparatus.

One embodiment of the non-foil laminate of the invention comprises a relatively thick (1.5 to 7.0 mils) void-bearing core film layer sandwiched between two thinner (0.25 to 1.5 mils), thermally stable outer non void-bearing oriented film layers, each adhered to the core layer with a conventional flexible packaging adhesive. One of the outer layers is made heat sealable to the container material by applying thereto a heat seal coating, hot melt adhesive or by laminating a heat seal film to such outer layer. Mechanical embossing of a laminate structure produces mechanical stress. In certain laminate structures, such mechanical stress may produce curling of the laminate. Advantageously, a hot melt adhesive coating will provide the lid with an embossed appearance without stressing or deforming the laminate or causing curling. This is accomplished by applying a molten hot melt adhesive to the laminate with an engraved gravure cylinder. The shape, size and volume of the cells on the engraved cylinder determine the amount and geometry or pattern of the hot melt adhesive applied to the laminate. A hot melt adhesive applied in such manner may also aid in denesting of the die-cut lids during the packaging operation.

The primary purpose of the core layer is to provide stiffness and enhance die-cuttability. A preferred material for the core layer is an opaque voided oriented polymeric film of the type disclosed, for example, in U.S. Pat. Nos. 4,337,616 to Ashcraft et al.; 4,438,175 to Ashcraft et al. or 4,770,931 to Pollock et al. Voided oriented polypropylene is a particularly preferred core layer. Other materials that are suitable for use as the core layer include a voided oriented polyester, an oriented polystyrene, foamed polystyrene, and mineral filled unoriented films. Where low oxygen permeability is desirable, a core layer comprising high density polyethylene (HDPE) coextruded with polyethylene vinyl alcohol (EVOH) may be used. One advantage of using a voided polymeric film or foamed film is that less total polymeric material is needed for a given thickness of the film, i.e., the film has a lower density. The voided films are normally substantially opaque with a pearlescent or opalescent appearance.

U.S. Pat. No. 4,758,462 to Park et al. and U.S. Pat. No. 4,337,616 to Ashcraft et al. each teach a void bearing core layer and non-void bearing surface layers, the structure of which is to be a substitute for paper. The surface layers are provided solely to prevent the film structure from manifesting the surface irregularities of the core layer. U.S. Pat. No. 4,780,364 to Wade et al. is directed to a packaging film formed by coextrusion. Wade et al. teaches the addition of particulate material to the surface layer or layers so as to form voids therein to create an attractive lustrous appearance.

Preferably, the two outer or balance layers comprise a nonvoid-bearing oriented polymeric film with good temperature stability, such as an oriented polyester film. Oriented films are preferred because of their superior mechanical properties, such as gauge uniformity and lay flat characteristics, as compared with unoriented films. A particularly preferred film is a nonvoid-bearing oriented polyester film such as polyethylene terephthalate (PET), although other oriented films, such as oriented polypropylene (OPP), oriented polyamide (nylon) and oriented polyethylene (OPE), may be used. Where improved barrier properties are required, it is also within the scope of the present invention to use a metallized film, such as metallized polyethylene terephthalate (MPET), metallized oriented polypropylene (MOPP) or metallized oriented polyethylene (MOPE).

A specific embodiment of the lidding laminate structure of the invention comprises a biaxially oriented voided polypropylene core layer having a thickness of about 2.5 mils. A 0.36 or 0.48 mil nonvoid-bearing biaxially oriented PET film is applied to both sides of the OPP core layer, with a two component urethane adhesive. The specific heat seal coating or layer applied to one of the outer PET film layers will depend upon the material of the container to which the laminate lid is to be heat sealed. In the case of a polypropylene container, a heat seal layer composed of ethylene vinyl acetate (EVA) or blends of EVA with other polymers compatible with polypropylene may be used.

It has also been found that when a lid made of a voided polymeric film, such as the biaxially oriented voided polypropylene film of the above-described preferred embodiment, is heat sealed to a container in a packaging machine, the heat sealed area of the lid changes in appearance from an opaque white (pearlescent or opalescent) to an essentially clear or transparent appearance. Such change in the appearance of the heat sealed area of the lid advantageously provides a visual indication of the integrity of the heat seal and may be used for quality control purposes.

Alternate embodiments of static charge dissipating lid structures comprise a void-bearing core layer to which is adhered a nonvoid-bearing balance layer on either side, with a heat seal layer adhered to one of the balance layers. The lidding structure is thus substantially similar to the embodiments described above, with the addition of a static charge dissipating layer. The static charge dissipating layer is adhered to the other balance layer. In one embodiment, the static charge dissipating layer is comprised of capacitor paper of approximately 0.35 mils thickness. In the second embodiment, a metallized vacuum layer having an optical density range of approximately 0.2 to 0.3 is deposited on the balance layer. Such static charge dissipating layers make it easier to denest stacks of the lids during packaging operations by reducing static attraction between lids in a stack of lids.

With the foregoing and other advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE INVENTION

Figure 1:
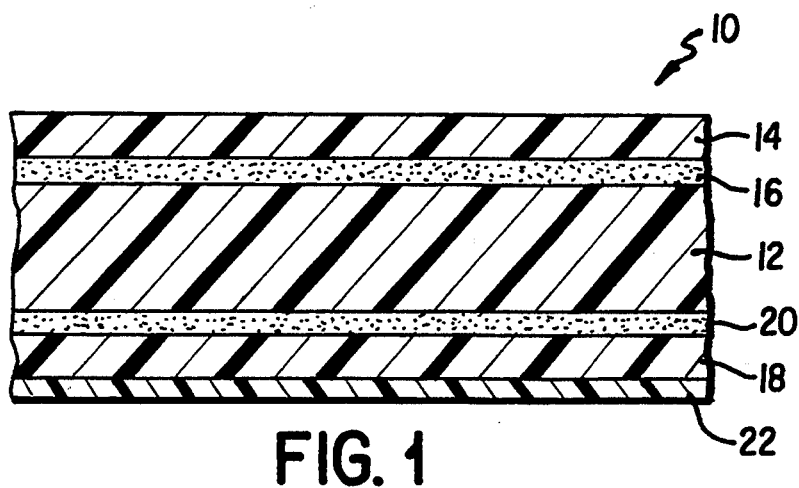
FIG. 1 is a fragmentary cross-section of one embodiment of the lidding laminate structure of the present invention.

Referring now to the drawings, there is illustrated in FIG. 1 a fragmentary cross-section of a lidding laminate structure made according to the invention which is designated generally by reference numeral 10. Laminate structure 10 comprises a central core layer 12 made of a voided polymeric film, preferably a voided oriented polypropylene film having a thickness in the range of 1.5 to 3.5 mils, and preferably a thickness of about 2.5 mils.

An outer layer 14 is bonded to one side of the core layer 12 by an adhesive 16 and another outer layer 18 is bonded to the other side of the core layer 12 by an adhesive 20. Outer layers 14, 18 are made of the same material, preferably a nonvoid-bearing oriented PET film having a thickness in the range of 0.25 to 0.75 mils and preferably a thickness of about 0.3–0.5 mils. Adhesive layers 16, 20 comprise a thin layer of urethane or other suitable adhesive. A heat seal film, layer or coating 22 is laminated or applied to layer 18 for heat sealing the laminate 10 to a container. The heat seal layer 22 may also be coextruded with outer layer 18.

The laminate structure 10 is constructed as a symmetrical or "balanced" film in that the structural and heat resistant components of the film, i.e., the outer layers 14, 18, are substantially identical on opposite sides of the core layer 12. Such symmetrical construction prevents the laminate 10 from curling when it is exposed to heat during the packaging operation.

Figure 2:
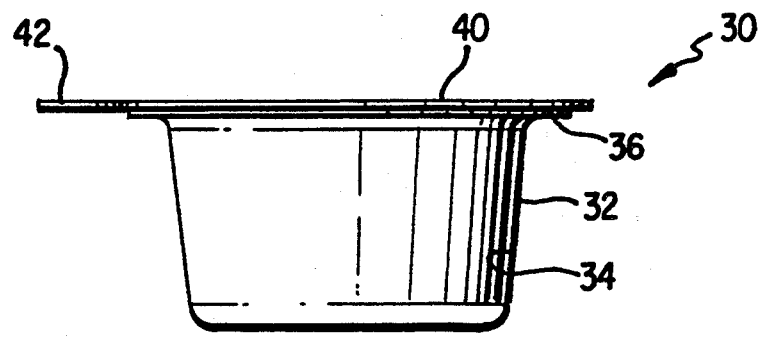
FIG. 2 is a side elevation view of a container with a lid of the invention heat sealed thereto.

FIG. 2 illustrates a container 30 comprising a cup 32 having a wall portion 34, an outturned lip portion 36 and a lid 40 with a pull tab 42 which is die-cut from the laminate 10 shown in FIG. 1. After the cup 32 is filled with material, e.g., a food product, the lid 40 is dispensed from a stack of lids and positioned by the packaging machine on the lip portion 36 of the cup 32. The heat seal mechanism or head of the packaging machine then contacts the lid 40 in the region of the lip 36 and, by a combination of heat and pressure applied in a conventional manner, the lid 40 is heat sealed to the lip 36 of the cup 32.

Figure 3:
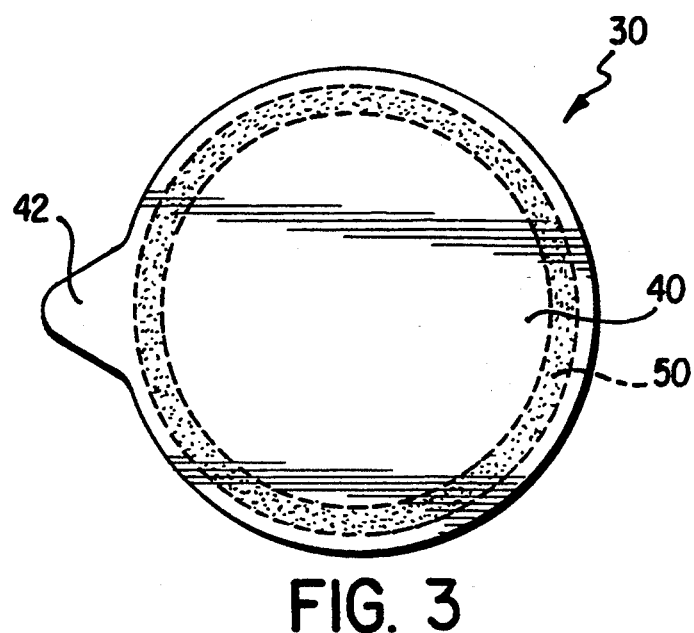
FIG. 3 is a top plan view of the heat sealed container of FIG. 2 illustrating the heat sealed area of the lid.

FIG. 3 shows a plan view of the lid 40 which has a generally circular shape with the pull tab 42 extending radially therefrom. The annular stippled area 50 defines the area to which heat is applied in the packaging machine to form a heat seal between the lid 40 and the lip 36 of the cup 32. It is this heat seal area which changes in appearance from opaque pearlescent or opalescent to clear or transparent when a voided film is used and provides a visual indication of the integrity of the heat seal.

Figure 4:
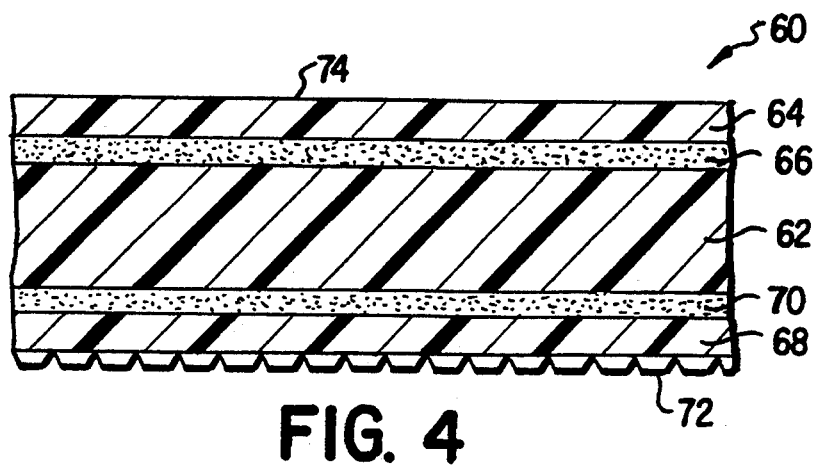
FIG. 4 is a fragmentary cross-section of a lidding laminate according to the invention with a pattern hot melt adhesive applied by an engraved gravure roller.

FIG. 4 illustrates in fragmentary cross-section an alternate embodiment of a laminate structure made according to the invention and designated generally by reference numeral 60. Laminate structure 60 comprises a central void-bearing core layer 62, nonvoid-bearing outer layers 64, 68 bonded to the opposite sides of core layer 62 with a respective adhesive layer 66, 70. This portion of the laminate is symmetrical and may be identical to the corresponding preferred structure shown and described above in connection with FIG. 1. The embodiment of FIG. 4 differs from that of FIG. 1 in that the heat seal layer 72 of FIG. 4 is provided as a pattern, e.g., a diamond-shaped pattern in plan view, of hot melt adhesive applied to the exterior of outer layer 68 by means of an engraved gravure roller. When viewed from the opposite side of the laminate, i.e., from surface 74, the pattern hot melt adhesive layer gives the laminate the appearance of an embossed laminate structure.

Figure 5:
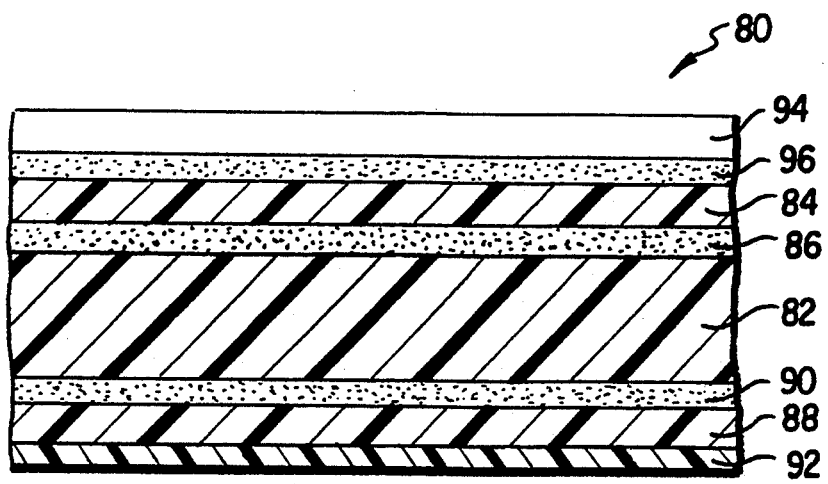
FIG. 5 is a fragmentary cross-section of a first alternate embodiment of the lidding laminate structure of the present invention having a static charge dissipating outer layer.

FIG. 5 shows in fragmentary cross-section a first alternate embodiment of a static charge dissipating laminate structure made according to the invention and designated generally by reference numeral 80. Laminate structure 80 comprises a central void-bearing core layer 82 nonvoid-bearing layers 84, 88 bonded to the opposite sides of core layer 82 with a respective adhesive layer 86, 90. This portion of the laminate is symmetrical and may be identical to the corresponding preferred structure shown and described above in connection with FIGS. 1 and 4. A heat seal layer 92 is provided to be sealed to the rim of a cup or package. Heat seal layer 92 is adhered to balance layer 88. The embodiment of FIG. 5 differs from that of FIGS. 1 and 4 in that a static charge dissipating layer 94 is provided made of capacitor paper and adhered to balance layer 84 by adhesive layer 96.

Figure 6:
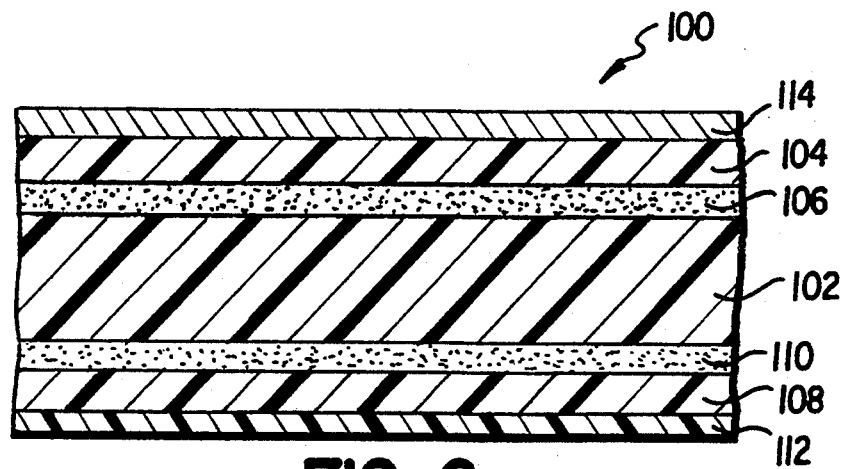
FIG. 6 is a fragmentary cross-section of a second alternate embodiment of the lidding laminate structure of the present invention having a static charge dissipating outer layer.

FIG. 6 illustrates in fragmentary cross-section a second alternate embodiment of a static charge dissipating laminate structure made according to the invention and designated generally by reference numeral 100. Laminate structure 100 comprises a central void-bearing core layer 102, nonvoid-bearing balance layers 104, 108 bonded to the opposite sides of core layer 102 with a respective adhesive layer 106, 110. This portion of the laminate is symmetrical and may be identical to the corresponding preferred structure shown and described above in connection with FIGS. 1 and 4. A heat seal layer 112 is adhered to balance layer 108. The embodiment of FIG. 6 differs from that of FIGS. 1 and 4 in that a vacuum metallized layer 114 is provided by deposition on balance layer 104.

EXAMPLE 1

A laminate structure according to the invention was prepared having the following construction:

The core layer corresponding to layer 12 of FIG. 1 was a 2.5 mil biaxially oriented voided opalescent polypropylene (OPP) film having a yield of 23,300 in.$^2$/lb. and commercially available from Mobil Chemical Company, Films Division, Pittsford, N.Y. 14534, under the trade name OPPalyte. To each side of the core layer a 48 gauge biaxially oriented nonvoid-bearing polyethylene terephthalate (PET) film commercially available from ICI Films, Wilmington, Del. 19897, under the trade name MELINEX 800 or MELINEX 813 was bonded using a two component polyurethane laminating adhesive applied at a dry weight of 2.0 lbs./3,000 ft.$^2$ (lb./ream) commercially available from Lord Corporation, Erie, Pa. 16514-0038, under the trade name TYCEL to produce a symmetrical laminate structure. A polyester heat seal coating was applied to the above-described symmetrical laminate structure at a dry weight of 3.0 lbs./3,000 ft.$^2$. This heat seal coating is commercially available from Morton International, Chicago, Ill. 60606-1598, under the trade name AD-COTE.

The laminate structure produced as described above was free of curl before die cutting. Individual lids 79 mm in diameter were cut from this laminate with a reciprocating die. The die cut lids lay flat and had no curl in either direction at room temperature. When exposed to the heat from a 400° F. heat seal head applied from the side opposite the heat seal layer, the lids remained flat and did not exhibit any noticeable curl. When the lids were placed in contact with the lip of containers filled with 200° F. water, no noticeable deflection or curl of the lids was observed.

EXAMPLE 2

A laminate structure according to the invention was prepared having the following construction:

The core layer was a 2.6 mil biaxially oriented voided opalescent polypropylene film having a yield of 14,000 in.$^2$/lb. and commercially available under the trade name OPPalyte from Mobil Chemical Company, Films Division, Pittsford, N.Y. 14534. To each side of the core layer a 36 gauge biaxially oriented nonvoid-bearing polyethylene terephthalate (PET) film manufactured by UNITIK, Ltd., Osaka, S41, Japan, under the trade name EMBLET 900 or EMBLET 900J was bonded using a two component solventless polyurethane laminating adhesive applied at a dry weight of 0.5 lb./3,000 ft.$^2$ commercially available from Lord Corporation, Erie, Pa. 16514-0038, under the trade name TYCEL to produce a symmetrical laminate structure. A heat seal coating of ethylene/vinyl acetate copolymer (0.75 mil thick) with a density of 0.95 gm./cm.$^3$ and vinyl acetate content of 25% by weight was applied to the above-described symmetrical laminate structure. This heat seal coating is commercially available from the DuPont Company, Wilmington, Del. 19898, under the trade name ELVAX.

The laminate structure of Example 2 was processed in the same manner as the structure of Example 1, except that the laminate was mechanically embossed between two engraved embossing rollers. The laminate was curl-free prior and subsequent to embossing and die cutting and when exposed to heat from either side under the same conditions described in Example 1.

EXAMPLE 3

A symmetrical laminate structure according to the invention was prepared using the same materials of the laminate described in Example 2. A heat seal layer comprising (i) a two component polyurethane laminating adhesive (TYCEL) was applied to one side of the laminate structure at a dry weight of 2.0 lbs./3,000 ft.$^2$ and (ii) a two-layer coextruded blown sealant film composed of 67% by volume polyethylene with a density of 0.93 gm./cc. and 33% by volume polyolefinic adhesive resin with a density of 0.93 gm./cc. was applied to one side of the symmetrical laminate structure.

The laminate structure of Example 3 was processed in the same manner as Example 2 and exhibited the same lay flat properties as the laminate structure of Example 2 when embossed, die cut and exposed to elevated temperature from either side.

EXAMPLE 4

A laminate structure according to the invention was prepared as a first embodiment to address the problem of static attraction between die-cut lids having the following construction:

The structure of a void-bearing core layer 82 adhesively bonded by adhesive layers 86, 90 to nonvoid-bearing layers 84, 88 was prepared, with a sealant layer 92 applied to one nonvoid-bearing layer 88 for bonding to the rim of a container. This structure was substantially the same as Example 1. A layer 94 of capacitor paper was applied to the other nonvoid-bearing layer 84 by adhesive layer 96. The capacitor paper is preferably 0.35 mil thick and is commercially available under the designation No. 35-ND, produced by M & D Dialecttic, Mount Holly Springs, Pa. The void-bearing core layer 82 has a thickness of approximately 2.5 mil thickness and is preferably an OPP film sold under the trade name OPPalyte by Mobil Chemical Company. The nonvoid-bearing layers 84, 88 each have a thickness of 0.36 or 0.48 mil and are preferably a PET film sold under the trade name MELINEX 800 or MELINEX 813 by ICI Films. The adhesive is preferably a two component polyurethane adhesive applied at a dry weight of 2.0 lbs/3,000 ft$^2$ (lb./ream) and sold under the trade name TYCEL by the Lord Corporation. The sealant layer 92 has a thickness of approximately 0.75 mil and is commercially available under the trade name ELVAX.

EXAMPLE 5

A laminate structure according to the invention was prepared as a second embodiment to address the problem of static attraction between die-cut lids having the following construction:

A void-bearing core layer 102 was adhesively bonded between two nonvoid-bearing layers 104, 108 by adhesive layers 106, 110. A sealant layer 112 is provided on one of the nonvoid-bearing layers 108 for sealing to the rim of a package or cup. This structure was substantially the same as Example 1. A vacuum metallized layer 114 is provided on the other nonvoid-bearing layer 104. The metallized layer 114 is comprised of aluminum and has an optical density range of 0.2 to 0.3. Such an optical density range permits scanning of the package by metal detection equipment, while dissipating static charge buildup. The void-bearing core layer 102 has a thickness of approximately 2.5 mil and is an OPP film such as that sold under the trade name OPPalyte by Mobil Chemical Company. The nonvoid-bearing layers 104, 108 each have a thickness of 0.36 or 0.48 mils and are preferably a PET film sold under the trade name MELINEX 800 or 813 by ICI Films. The adhesive is preferably a two component polyurethane adhesive applied at a dry weight of 2.0 lbs/3,000 ft$^2$ (lb./ream) and sold under the trade name TYCEL by the Lord Corporation. The sealant layer 112 has a thickness of approximately 0.75 mil and is commercially available under the trade name ELVAX.

Of course, either of the static charge dissipating embodiments of EXAMPLES 4 and 5 can have an embossed sealant layer.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A non-foil lidding laminate comprising:
   a core layer comprising a void-bearing opalescent oriented polypropylene film having a thickness in the range of about 1.5 to about 7.0 mils;
   first and second outer balance layers having substantially the same thickness laminated to the opposite sides of the core layer, said first and second outer balance layers each comprising a nonvoid-bearing polyethylene terephthalate film having a thickness in the range of about 0.25 mils to about 1.5 mils, such thickness being sufficient to balance said core layer to prevent curling of said lidding laminate.

2. The lidding laminate of claim 1 including a heat seal layer applied to one of the outer balance layers.

3. The lidding laminate of claim 2, wherein said heat seal layer is a hot melt adhesive applied in a pattern to the exterior surface of one of said outer balance layers.

4. The lidding laminate of claim 3, wherein said pattern is diamond shaped.

5. The lidding laminate of claim 1 wherein said outer balance layers are biaxially oriented.

6. The lidding laminate of claim 1 wherein the outer balance layers are laminated to the core layer with a polyurethane laminating adhesive.

7. A non-foil lidding laminate for making a die-cut lid to be heat sealed to a polymeric container, said laminate comprising:
- a core layer comprising a void-bearing, opalescent, opaque, oriented polypropylene film having a thickness in the range of about 1.5 to about 7.0 mils;
- first and second outer balance layers having substantially the same thickness and being adhesively laminated to the opposite sides of the core layer, said first and second layers each comprising a nonvoid-bearing biaxially oriented polyethylene terephthalate film having a thickness in the range of about 0.25 to about 1.5 mils; and
- a heat seal layer applied to the exterior of one of the outer balance layers, said heat seal layer comprising a patterned hot melt adhesive for heat sealing a lid die-cut from the laminate to a polymeric container.

8. A non-foil lidding laminate comprising:
- a core layer comprising a void-bearing opalescent oriented polypropylene film having a thickness in the range of about 1.5 to about 7.0 mils, said core layer being the sole void-bearing layer in said laminate;
- first and second outer balance layers having substantially the same thickness laminated to the opposite sides of the core layer, said first and second outer balance layers each comprising a polyethylene terephthalate film having a thickness in the range of about 0.25 mils to about 1.5 mils.

9. A non-foil laminate for making a die-cut lid to be heat sealed to a polymeric container, said laminate comprising:
- a core layer comprising a void-bearing, opalescent, opaque, oriented polypropylene film having a thickness in the range of about 1.5 to about 7.0 mils, said core layer being the sole void-bearing layer in said laminate;
- first and second outer balance layers having substantially the same thickness and being adhesively laminated to the opposite sides of the core layer, said first and second layers each comprising a biaxially oriented polyethylene terephthalate film having a thickness in the range of about 0.25 to about 1.5 mils; and
- a heat seal layer applied to the exterior of one of the outer balance layers, said heat seal layer comprising a patterned hot melt adhesive for heat sealing a lid die-cut from the laminate to a polymeric container.

10. A non-foil lidding laminate comprising:
- a core layer comprising a void-bearing opalescent oriented polypropylene film having a thickness in the range of about 1.5 to about 7.0 mils;
- first and second outer balance layers having substantially the same thickness laminated to the opposite sides of the core layer, said first and second outer balance layers each comprising a nonvoid-bearing polyethylene terephthalate film having a thickness in the range of about 0.25 mils to about 1.5 mils, such thickness being sufficient to balance said core layer to prevent curling of said lidding laminate; and
- a layer of capacitor paper adhered to at least one of said outer balance layers.

11. A non-foil lidding laminate for making a die-cut lid to be heat sealed to a polymeric container, said laminate comprising:
- a core layer comprising a void-bearing, opalescent, opaque, oriented polypropylene film having a thickness in the range of about 1.5 to about 7.0 mils;
- first and second outer balance layers having substantially the same thickness and being adhesively laminated to the opposite sides of the core layer, said first and second layers each comprising a nonvoid-bearing biaxially oriented polyethylene terephthalate film having a thickness in the range of about 0.25 to about 1.5 mils;
- a layer of capacitor paper adhered to at least one of said outer balance layers; and
- a heat seal layer applied to the exterior of one of the outer balance layers, said heat seal layer comprising a patterned hot melt adhesive for heat sealing a lid die-cut from the laminate to a polymeric container.

12. A non-foil lidding laminate comprising:
- a core layer comprising a void-bearing opalescent oriented polypropylene film having a thickness in the range of about 1.5 to about 7.0 mils, said core layer being the sole void-bearing layer in said laminate;
- first and second outer balance layers having substantially the same thickness laminated to the opposite sides of the core layer, said first and second outer balance layers each comprising a polyethylene terephthalate film having a thickness in the range of about 0.25 mils to about 1.5 mils; and
- a layer of capacitor paper adhered to at least one of said outer balance layers.

13. A non-foil laminate for making a die-cut lid to be heat sealed to a polymeric container, said laminate comprising:
- a core layer comprising a void-bearing, opalescent, opaque, oriented polypropylene film having a thickness in the range of about 1.5 to about 7.0 mils, said core layer being the sole void-bearing layer in said laminate;
- first and second outer balance layers having substantially the same thickness and being adhesively laminated to the opposite sides of the core layer, said first and second layers each comprising a biaxially oriented polyethylene terephthalate film having a thickness in the range of about 0.25 to about 1.5 mils;
- a layer of capacitor paper adhered to at least one of said outer balance layers; and
- a heat seal layer applied to the exterior of one of the outer balance layers, said heat seal layer comprising a patterned hot melt adhesive for heat sealing a lid die-cut from the laminate to a polymeric container.

14. A lidding laminate comprising:
a core layer comprising a void-bearing opalescent oriented polypropylene film having a thickness in the range of about 1.5 to about 7.0 mils;
first and second outer balance layers having substantially the same thickness laminated to the opposite sides of the core layer, said first and second outer balance layers each comprising a nonvoid-bearing polyethylene terephthalate film having a thickness in the range of about 0.25 mils to about 1.5 mils, such thickness being sufficient to balance said core layer to prevent curling of said lidding laminate, and wherein at least one of said outer balance layers is metallized.

15. A lidding laminate for making a die-cut lid to be heat sealed to a polymeric container, said laminate comprising:
a core layer comprising a void-bearing, opalescent, opaque, oriented polypropylene film having a thickness in the range of about 1.5 to about 7.0 mils;
first and second outer balance layers having substantially the same thickness and being adhesively laminated to the opposite sides of the core layer, said first and second layers each comprising a nonvoid-bearing biaxially oriented polyethylene terephthalate film having a thickness in the range of about 0.25 to about 1.5 mils, and wherein at least one of said outer balance layers is metallized; and
a heat seal layer applied to the exterior of one of the outer balance layers, said heat seal layer comprising a patterned hot melt adhesive for heat sealing a lid die-cut from the laminate to a polymeric container.

16. A lidding laminate comprising:
a core layer comprising a void-bearing opalescent oriented polypropylene film having a thickness in the range of about 1.5 to about 7.0 mils, said core layer being the sole void-bearing layer in said laminate;
first and second outer balance layers having substantially the same thickness laminated to the opposite sides of the core layer, said first and second outer balance layers each comprising a polyethylene terephthalate film having a thickness in the range of about 0.25 mils to about 1.5 mils, wherein at least one of said outer balance layers is metallized.

17. A laminate for making a die-cut lid to be heat sealed to a polymeric container, said laminate comprising:
a core layer comprising a void-bearing, opalescent, opaque, oriented polypropylene film having a thickness in the range of about 1.5 to about 7.0 mils, said core layer being the sole void-bearing layer in said laminate;
first and second outer balance layers having substantially the same thickness and being adhesively laminated to the opposite sides of the core layer, said first and second layers each comprising a biaxially oriented polyethylene terephthalate film having a thickness in the range of about 0.25 to about 1.5 mils, wherein at least one of said outer balance layers is metallized; and
a heat seal layer applied to the exterior of one of the outer balance layers, said heat seal layer comprising a patterned hot melt adhesive for heat sealing a lid die-cut from the laminate to a polymeric container.

18. A non-foil lidding laminate comprising:
a core layer comprising a void-bearing opalescent oriented polypropylene film having a thickness in the range of about 1.5 to about 7.0 mils;
first and second outer balance layers having substantially the same thickness laminated to the opposite sides of the core layer, said first and second outer balance layers each comprising a nonvoid-bearing polyethylene terephthalate film having a thickness in the range of about 0.25 mils to about 1.5 mils, such thickness being sufficient to balance said core layer to prevent curling of said lidding laminate,
said core layer thickness and said balance layer thicknesses selected so as to cooperate to form a structure having sufficient stiffness to be suitable as a lidding laminate.

* * * * *